United States Patent [19]

Heck et al.

[11] Patent Number: 5,024,719
[45] Date of Patent: Jun. 18, 1991

[54] CONTINUOUS STAMPING MACHINE

[75] Inventors: Ernst Heck, Echandens; Jean Horisberger, Ecublens, both of Switzerland

[73] Assignee: Nestec S. A., Vevey, Switzerland

[21] Appl. No.: 296,409

[22] Filed: Jan. 9, 1989

Related U.S. Application Data

[63] Continuation of Ser. No. 73,493, Jul. 15, 1987, abandoned.

[30] Foreign Application Priority Data

Aug. 7, 1986 [CH] Switzerland .................. 3178/86

[51] Int. Cl.$^5$ .................. B32B 31/00; B32B 31/04
[52] U.S. Cl. .................. 156/522; 156/353; 156/540; 156/553; 156/582; 101/8; 425/194; 425/385
[58] Field of Search .............. 156/219, 220, 221, 222, 156/209, 353, 354, 355, 553, 522, 515, 517, 518, 568, 567, 582, 583.4; 100/232; 101/3 R, 5, 6, 8, 21, 22, 23, 24, 25, 27, 31; 264/119, 163, 284, 293, 285, 313, 151, 160

[56] References Cited

U.S. PATENT DOCUMENTS

| | | | |
|---|---|---|---|
| 1,331,790 | 2/1920 | Venge | 101/8 |
| 1,876,432 | 9/1932 | Phillips | 264/284 |
| 2,585,410 | 2/1952 | Schott | 101/5 |
| 2,818,015 | 12/1957 | Fiala | 101/5 |
| 2,950,221 | 8/1960 | Bauer et al. | 156/220 |
| 3,433,181 | 3/1969 | Steins . | |
| 3,730,081 | 5/1973 | Colledge | 101/5 |
| 3,829,271 | 8/1984 | Taylor | 425/385 |
| 4,225,374 | 9/1980 | Kaufmann | 156/220 |
| 4,417,867 | 11/1983 | Bauer . | |
| 4,436,576 | 3/1984 | Seiden | 156/582 |
| 4,701,235 | 10/1987 | Mitsam | 156/582 |

OTHER PUBLICATIONS

SN. 07/025,509, Heck, filed 3-13-87.

*Primary Examiner*—Michael W. Ball
*Assistant Examiner*—Louis Falasco
*Attorney, Agent, or Firm*—Vogt & O'Donnell

[57] ABSTRACT

A machine for continuously stamping at least one advancing product strip has a stamping wheel, the rotatable wheel having at least one heated stamping die positioned about its outer circumference, and has a rotatable shaft for driving the stamping wheel and pairs of rotatable synchronizing rollers affixed on rotatable shafts upstream and downstream of the stamping wheel in the line of the advancing strip for positioning the advancing strip for stamping and for delivering the advancing stamped strip for cutting. The stamping wheel driving shaft and the shafts of the synchronizing rollers are connected to a motor for being driven in synchronism so the stamping wheel and rollers have a peripheral speed equal to the linear speed of advance of the product strip. A plurality of stamping wheels may be aligned side by side for being driven by one driving shaft for stamping a plurality of advancing product strips with the pairs of rollers extending and encompassing each product strip advancing to and departing from the stamping wheel. For cutting the stamped product strip or strips, a rotatable cutting device is affixed on a rotatable shaft and a cooperating rotatable anvil wheel is affixed on a rotatable shaft downstream of the pair of rollers which are downstream of the stamping wheel. The cutting device and anvil wheel also are driven in synchronism with the other elements so the cutting device and anvil wheel will have a peripheral speed equal to the linear speed of the advancing stamped product strip.

11 Claims, 3 Drawing Sheets

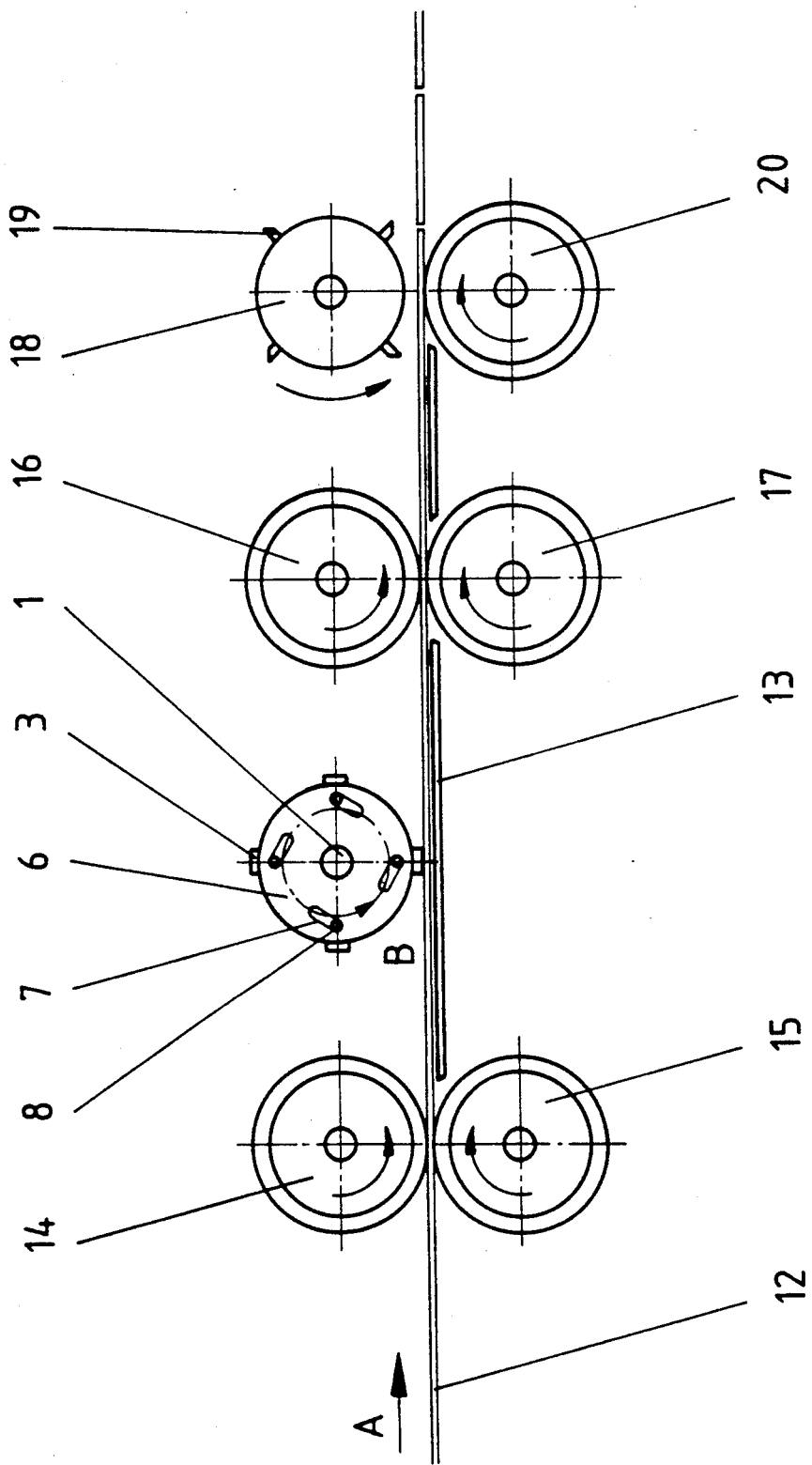

CONTINUOUS STAMPING MACHINE

This application is a continuation of Ser. No. 07/073,493 filed 7-15-87, now abandoned.

BACKGROUND OF THE INVENTION

This invention relates to a machine for continuously stamping at least one strip of flat or shaped products.

The problem on which the present invention is based is to form a stamp on a flat or shaped product continuously, at high speed and with a contact time of the order of one hundredth of a second.

SUMMARY OF THE INVENTION

The invention relates to a stamping machine for continuously stamping at least one strip of flat or shaped products, comprising a shaft rotating at a peripheral speed equal to the rate of advance of the strip and comprising at least one stamping wheel with at least one heating die, said wheel being perpendicular to the axis of the shaft.

In the context of the invention, stamping is understood to be the formation of a stamp by heat transfer and partial overcooking of the flat product in question. According to the invention, it is possible to stamp any type of food product, such as a dough-based food product, and more especially a flat product obtained by extrusion cooking with the extrusion die according to Swiss patent application no. 1364/86-2 filed 8th Apr. 1986.

It is also possible to stamp non-food products with the machine according to the invention. By strip is meant both products which are not cut up before stamping and also products which have already been cut up.

DETAILED DESCRIPTION OF THE INVENTION

According to the invention, the rotating shaft is arranged perpendicularly to the direction of movement of the flat product. The number of stamping wheels which it comprises is not critical, preferably being between 1 and 10. The number of stamping wheels corresponds to the number of strips of product to be stamped. The stamping wheels are arranged at intervals substantially corresponding to between one and two times the width of the strip of flat or shaped product.

The number of dies per stamping wheel is not critical. The only limitation is in the cost and the overall dimensions. Each stamping wheel preferably comprises from 1 to 20 dies.

The stamp of the heating die is heated to the appropriate temperature, for example between 50° and 600° C. and preferably between 300° and 400° C., by means of a heating element incorporated in said die near said stamp in order to ensure maximal transmission of heat. Two such heating elements are preferably provided, the second heating element coming on automatically in the event of failure of the first. The presence of this second heating element is important in that it prevents the entire production line from having to be stopped in the event of failure.

Each heating die is telescopically mounted on the stamping wheel. It is thus possible to regulate the distance between the successive stamps according to the length of the flat product being made. It is of course also possible vertically to regulate the position of the axis of the rotating shaft according to the thickness of the flat or shaped product obtained and the position of the heating dies.

In order to form the stamp on a flat product in always the same place on that product, the machine according to the invention comprises a pair of vertically adjacent synchronizing rollers on either side of and parallel to the rotating shaft. These four rollers rotate at the same speed as the shaft carrying the stamping wheels. The same applies to the cutting shaft and to the associated anvil roller arranged downstream of the rotating shaft. All these elements are driven in synchronism by a single motor and each comprise a toothed wheel for driving by means of a chain.

If the position of the stamps is altered telescopically to vary the length of the product, either the diameter of the synchronizing rollers is changed and the position of the cutters adapted or the reduction ratio is changed via the toothed wheels of the synchronizing rollers and the cutting rollers.

The machine according to the invention provides a high-speed, continuous and relatively compact stamping system which enables a regular and very clean impression to be formed on flat or shaped moving products.

According to the invention, it is possible to provide a rotating brush arranged above the rotating shaft with the stamps in order to clean them and also a suction hood for removing fine particles.

The invention is described in more detail in the following with reference to the accompanying drawings.

BRIEF DESCRIPTION OF THE DRAWINGS

FIG. 3 is a side elevation of the machine shown in FIG. 1.

DETAILED DESCRIPTION OF THE DRAWINGS AND DESCRIPTION OF PREFERRED EMBODIMENTS

Figure 1:
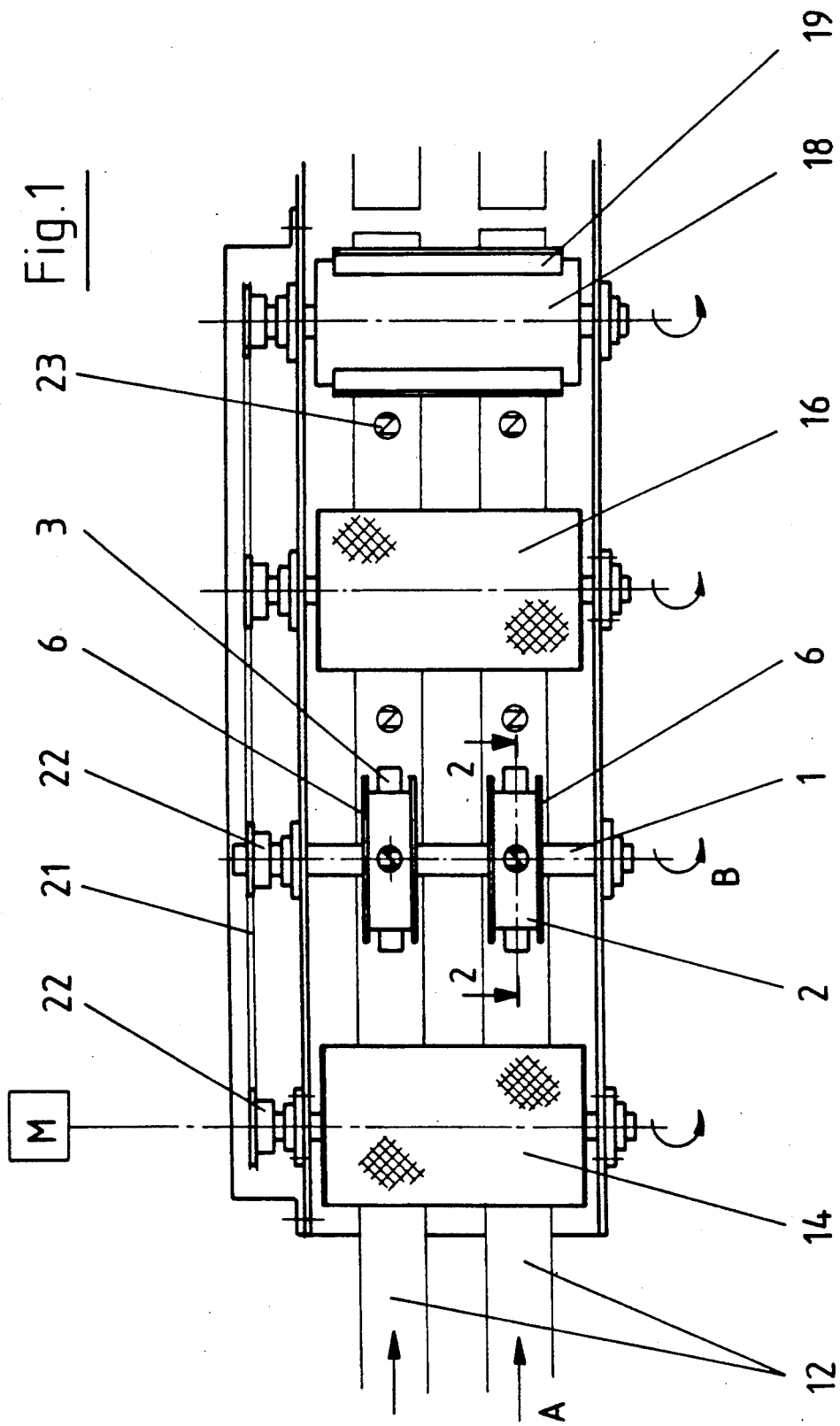
FIG. 1 is a diagrammatic view from above of the machine according to the invention with two stamping wheels.
Figure 2:
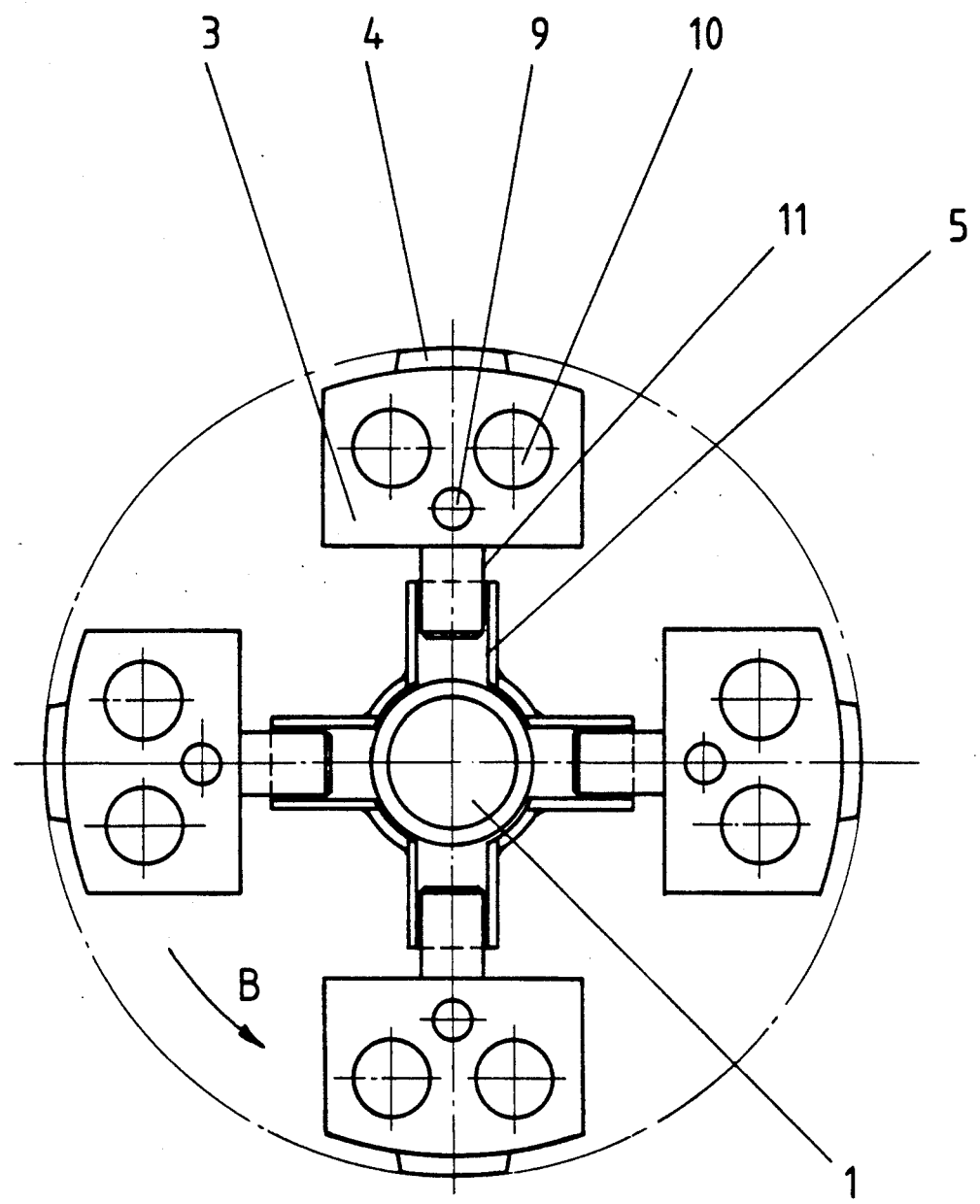
FIG. 2 is a section on the line 2—2 in FIG. 1.

The machine comprises a rotating shaft (1) carrying two stamping wheels (2) with four heating dies (3). Suitable stamps (4) are provided on these dies which are preferably made of chrome iron. The dies are telescopic by means of their rod (11) in corresponding bores (5) on the shaft (1) by means of two discs (6) with slots (7) cooperating with rods (8) provided in the bores (9) of each heating die. The heating elements (10), preferably of iron, are fed by a collector and a control system (not shown). They are positioned near the stamp (4) for effective transmission of heat.

The shaft (1) rotates in the direction of the arrow B above the strips of flat product (12) advancing in the direction of the arrows (A) (FIG. 1).

On either side of the rotating shaft (1) there are synchronizing rollers (14,15,16,17) of which the axes are parallel to that of the rotating shaft (1). Downstream of the shaft (1), there is a cutting shaft (18) with cutters (19) cooperating with an anvil wheel (20) disposed beneath the cutting shaft.

FIG. 3 shows clearly the direction of movement of the strip of flat product (12) and the direction of rotation of all the rollers of the machine according to the invention. As also illustrated, a table is positioned between rollers (16) and (17) an cutting shaft (18).

The machine according to the invention operates as follows:

A motor M drives the shaft (1), the synchronizing rollers (14,15,16,17), the cutting device (18) on a shaft and the anvil roller (20) in synchronism by means of a chain (21). The peripheral speed of all these rollers is equal to the rate of advance of the two strips of flat product (12). The shaft of each roller has a toothed wheel (22) with which the chain (21) engages to drive the whole system. The strips of flat product arrive properly positioned by means of the synchronizing rollers (14) to (17) and pass onto the supporting table (13) beneath the stamping system where they are given the stamp (23). They are then cut to the required length by the cutters (19). The flat products are now ready for packing.

To move the heating dies (3), the two discs (6) are rotated in the direction of the arrow B (FIG. 3) with the machine at rest so that the rods (8) engaged in the bores (9) of each heating die (3) slide into the slots (7) of the disc (6) to bring each die back nearer the centre of the shaft (1). To this end, the slots (7) are oblong in shape and eccentric in relation to the centre of the disc (6). Other embodiments for making the heating dies (3) telescopic are of course also possible.

The strip of flat or shaped product advances at a speed of from 0.2 to 1 m/s. The stamp is formed on the flat product in a contact time of the order of one hundredth of a second.

The machine according to the invention gives a product of good appearance which creates the impression of being oven-baked with a sharp, clear and precise stamp.

It is also possible with the machine according to the invention to vary the position of the stamp on the product by varying the relative position of the heating dies on the stamping wheel and the cutters on the cutting shaft or by staggering said stamp on one and the same strip by staggering the heating dies over the width of said band to be stamped.

We claim:

1. A machine for continuously stamping at least one advancing product strip comprising:

a table having a stationary surface for supporting at least one product strip advancing in contact therewith;

at least one stamping wheel affixed to a rotatable shaft positioned above the surface of the table such that the shaft has a longitudinal axis perpendicular to a cross section of an outer circumference of each stamping wheel which, in turn, defines a plane perpendicular to a plane of the surface of the table, each stamping wheel having about its outer circumference at least one stamping die which is capable of being heated and being positioned for contacting the at least one stamping die with a product strip to be stamped advancing on the surface of the supporting table for stamping the advancing product strip;

a first pair of rollers, each roller being affixed to a rotatable shaft and being displaced vertically one from another and positioned upstream of the stamping wheel and table, for positioning at least one product strip to be stamped on the surface of the table for stamping;

a second pair of rollers, each roller being affixed to a rotatable shaft and being displaced vertically one from another and positioned downstream from the stamping wheel for receiving from the surface of the table at least one stamped product strip and for delivering each stamped product strip for being cut; and a driving motor connected with the stamping wheel shaft and the roller shafts of the first and second pairs of rollers for driving the shafts for driving the stamping wheel and the pairs of rollers in synchronism at a peripheral speed equal to a linear speed of advance of the product strip.

2. A machine according to claim 1 wherein there are a plurality of stamping wheels aligned side by side affixed to the stamping wheel shaft and wherein each pair of rollers extends to encompass each product strip advancing to and departing from each stamping wheel.

3. A machine according to claim 1 further comprising a cutting device affixed to a rotatable shaft and a cooperating anvil wheel affixed to a rotatable shaft for cutting the stamped product strip.

4. A machine according to claim 3 wherein the cutting device shaft and the anvil wheel shaft are connected with the driving motor for being driven in synchronism with the stamping wheel shaft and the roller shafts for driving the cutting device and anvil wheel at a peripheral speed equal to the linear speed of advance of the product strip.

5. A machine according to claim 3 or 4 further comprising a second table downstream of the second pair of rollers and upstream of the cutting device and anvil wheel.

6. A machine according to claim 4 wherein the anvil wheel is disposed beneath the cutting device.

7. A machine according to claim 2 further comprising a plurality of cutting devices affixed to the cutting device shaft and a plurality of cooperating anvil wheels affixed to the anvil wheel shaft which extend to encompass each advancing stamped product strip for cutting each stamped product strip.

8. A machine according to claim 7 wherein the cutting device shaft and the anvil wheel shaft are connected with the driving motor for being driven in synchronism with the stamping wheel shaft and the roller shafts for driving each cutting device and each anvil wheel at a peripheral speed equal to the linear speed of advance of the product strip.

9. A machine according to claim 8 wherein the anvil wheel is disposed beneath the cutting device.

10. A machine according to claim 1 wherein there are from 2 to 20 stamping dies and each die has at least one heating element for heating the die.

11. A machine according to claim 10 wherein each heating die is telescopically mounted.

* * * * *